(12) United States Patent
Jasmin et al.

(10) Patent No.: US 11,876,482 B1
(45) Date of Patent: Jan. 16, 2024

(54) ELECTRICAL JUMPER FOR EQUIPOTENTIAL ELECTRICAL CONNECTION

(71) Applicant: Sunmodo Corporation, Vancouver, WA (US)

(72) Inventors: Roland Jasmin, Portland, OR (US); Matthew Danning, Oakland, CA (US)

(73) Assignee: Sunmodo Corporation, Vancouver, WA (US)

( * ) Notice: Subject to any disclaimer, the term of this patent is extended or adjusted under 35 U.S.C. 154(b) by 0 days.

(21) Appl. No.: 18/140,537

(22) Filed: Apr. 27, 2023

(51) Int. Cl.
- *H02S 40/00* (2014.01)
- *H02S 40/36* (2014.01)
- *H01R 4/28* (2006.01)
- *H02S 30/10* (2014.01)

(52) U.S. Cl.
CPC ............... *H02S 40/36* (2014.12); *H01R 4/28* (2013.01); *H02S 30/10* (2014.12)

(58) Field of Classification Search
CPC .......... H02S 40/36; H02S 30/00; H02S 30/10; F24S 25/614; F24S 25/67
See application file for complete search history.

(56) References Cited

U.S. PATENT DOCUMENTS

| | | | |
|---|---|---|---|
| 2,385,209 | A | 9/1945 | Joyce |
| 3,388,369 | A | 6/1968 | Zalmans |
| 5,429,335 | A | 7/1995 | Cunningham |
| 8,992,269 | B2 | 3/2015 | Salzmann et al. |
| 9,209,529 | B2 | 12/2015 | Magno et al. |
| 9,318,831 | B2 | 4/2016 | Yamada et al. |
| 10,103,688 | B2 | 10/2018 | Rossi |
| 10,454,190 | B1 | 10/2019 | Martin |
| 10,852,038 | B2 * | 12/2020 | Rothschild ............... H02S 30/10 |
| 2011/0316546 | A1 | 12/2011 | Bruno et al. |
| 2013/0048056 | A1 | 11/2013 | Kilgore et al. |
| 2014/0014163 | A1 | 1/2014 | McCarthy |
| 2014/0220834 | A1 | 8/2014 | Rizzo |
| 2018/0090856 | A1 | 3/2018 | Martin |

(Continued)

FOREIGN PATENT DOCUMENTS

| | | |
|---|---|---|
| EP | 2528166 A1 | 9/2015 |
| WO | 2022119855 A1 | 6/2022 |

OTHER PUBLICATIONS

DynoBond Datasheet, Apr. 2014, DynoRaxx, Buffalo, New York.

(Continued)

*Primary Examiner* — Phuong Chi Thi Nguyen
(74) *Attorney, Agent, or Firm* — Stone Creek Services LLC; Alan M Flum

(57) ABSTRACT

This disclosure discusses an electrical jumper for equipotential electrical connection between devices. The electrical jumper may include a body and clamps optionally positioned on opposite ends of the body. The clamps include a series of interlacable multi-hinged fingers. Downward-facing fingers and upward-facing fingers extend away from the body. The downward-facing fingers may interlace with the upward-facing fingers when unclamped. When clamped, downward-facing fingers may interlace with the upward-facing fingers may alternate. The ends of the upward-facing fingers and downward-facing fingers may face inward toward the body. The fingers may move and hinge independently of one another along multiple hinges.

9 Claims, 12 Drawing Sheets

(56) References Cited

U.S. PATENT DOCUMENTS

2022/0190781 A1    6/2022   Stephan et al.
2023/0025781 A1    1/2023   Keller

OTHER PUBLICATIONS

8" Module Bonding Jumper Cut Sheet, v1.0, Jul. 2019, IronRidge, Hayward, California.
Pegasus PSR-NSJ Bonding Jumper, downloaded from the Internet from https://tandem-solar-systems.com/product/pegasus-psr-nsj-bonding-jumper/ on Mar. 28, 2023.
Bonding Jumper, S 5 Manufacturing LLC, Iowa Park, Texas, downloaded from the Internet from https://www.s-5.com/product/bonding-jumper/ on Mar. 28, 2023.
Wiley WEEB Bonding Jumper Datasheet, Jun. 2010, Hubbel Incorporated, Shelton, Connecticut.
Finger Strip Gasket, E-Song EMC, downloaded from the Internet from https://esongemc.com/eng/page/product/m04/Finger_Strip_Gasket.php on Mar. 29, 2023.
Module Jumper SS 8" Product Cut Sheet, Rev. CS1 Jan. 2022, EcoFasten Solar LLC, Phoenix, Arizona.

\* cited by examiner

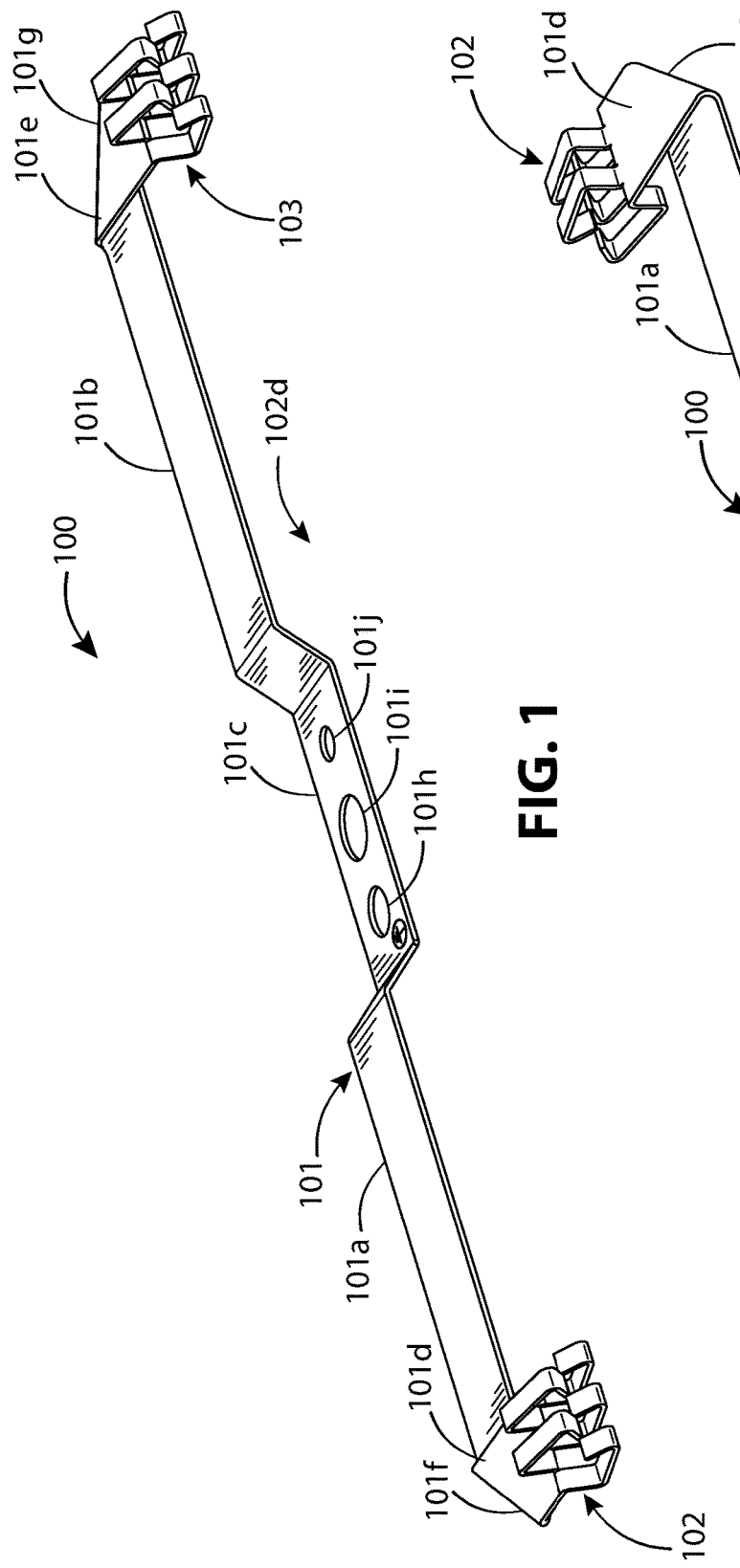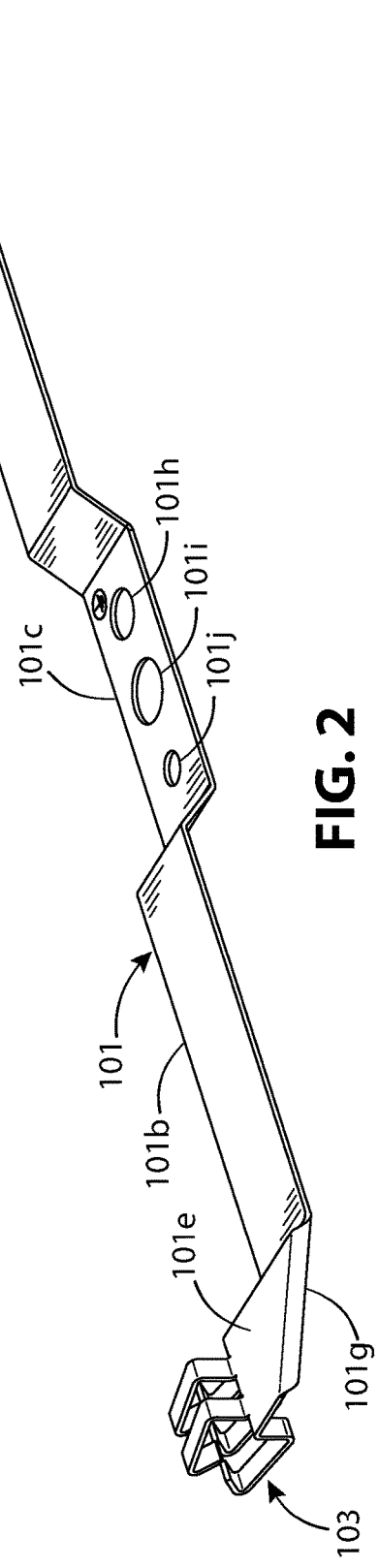

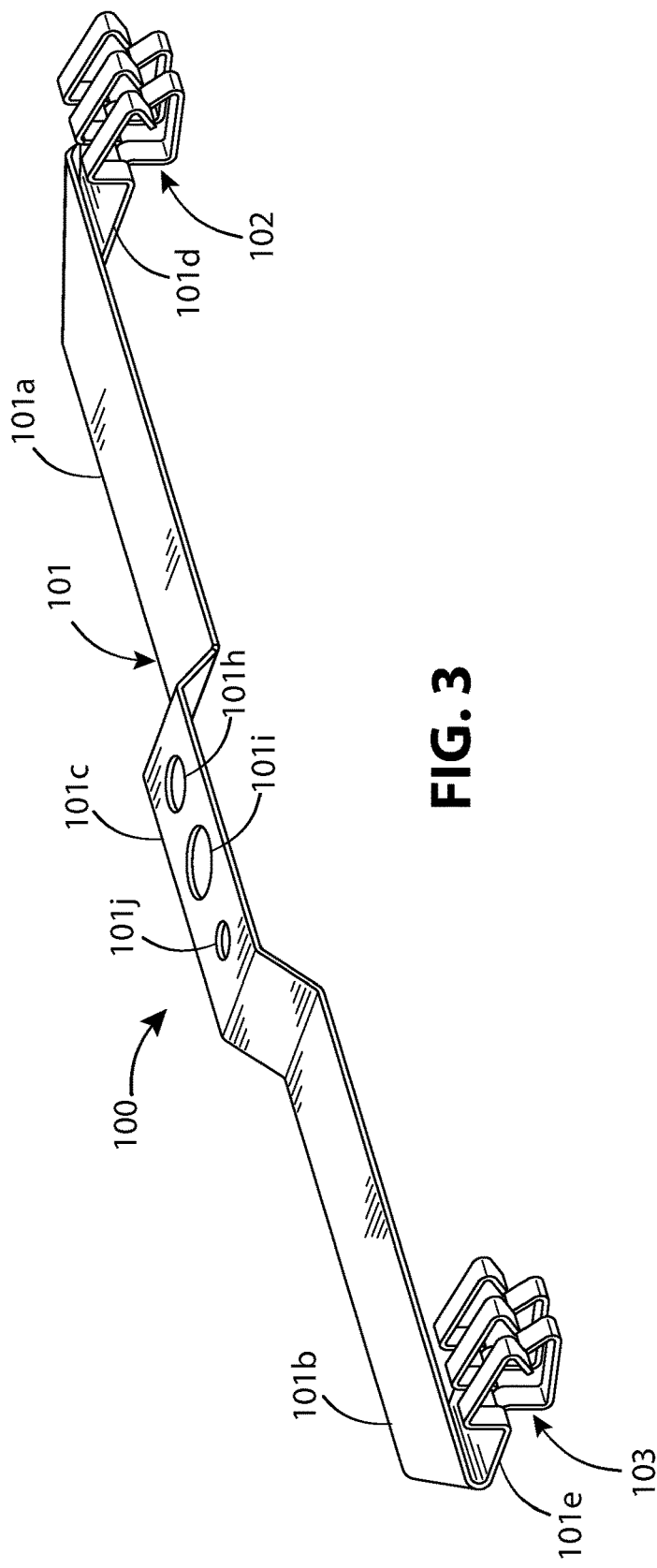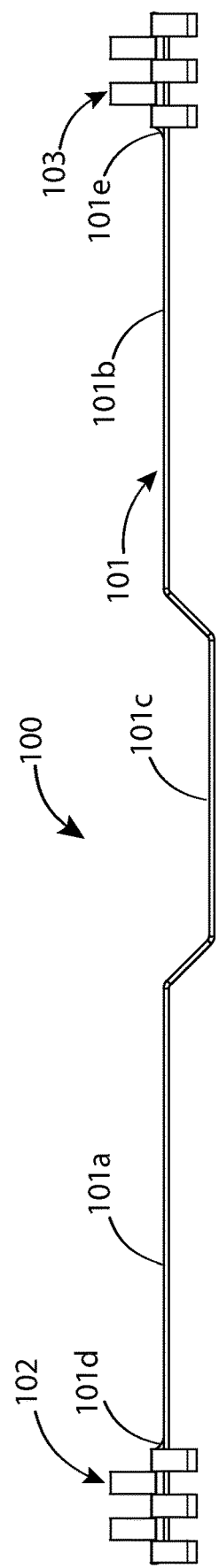

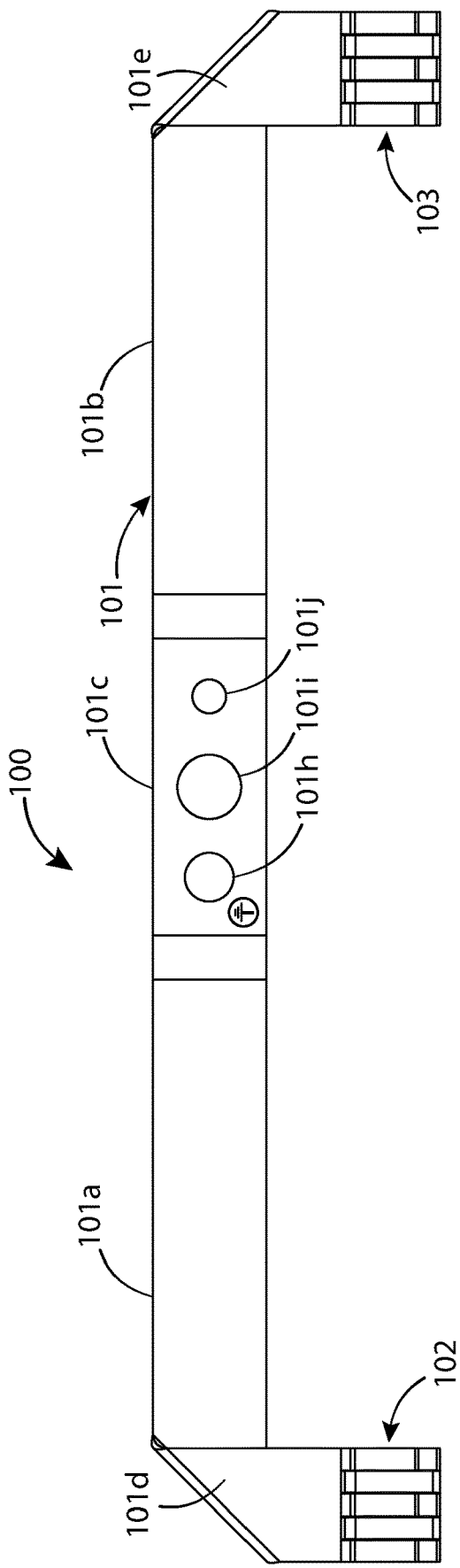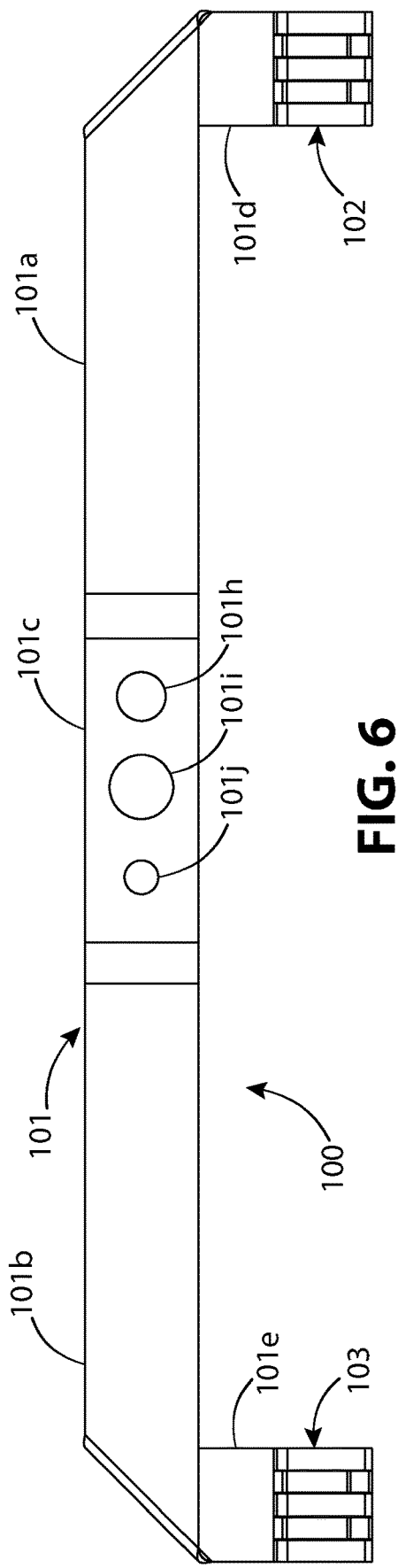

ELECTRICAL JUMPER FOR EQUIPOTENTIAL ELECTRICAL CONNECTION

BACKGROUND

Electrical devices may include chassis or frames made from aluminum, steel, or other materials that conduct electricity. Exposed frames or chassis with an electrical potential or voltage different from the surrounding environment may cause injury or equipment damage.

Equipotential electrical connection, or "electrical bonding," brings electrically conductive chassis or frames to the same electrical potential. There are several ways to achieve this. An installer might tie devices to a grounded wire or bus bar. The installer may electrically bond device frames or chassis to their neighbor, in a daisy chain, and electrically bond one chassis or frame to earth ground. The installer may electrically bond devices together using an electrical jumper with threaded fasteners. The installer could use an electrical jumper with clamps to achieve the same results.

SUMMARY

This disclosure describes an electrical jumper for equipotential electrical connection between devices. The electrical jumper may have superior holding strength and better electrical conductivity. The electrical jumper may include a body and a pair of clamps. The pair of clamps extend from the body. They may extend obliquely, perpendicularly, or lengthwise from opposite ends of the body. They may also extend from other portions of the body. The improved holding strength may derive from clamps that include a series of interlacable multi-hinge fingers. The fingers are multi-hinged in the sense that there are two or more hinge portions per finger. The hinge portion may be a radiused bend. The hinge portion may optionally be a living hinge. Downward-facing fingers interlace with upward-facing fingers when the clamps are unclamped. The clamps may extend from the end of the body or optionally from other portions of the body. Finger ends of one or more of the fingers may face inward toward the body. The fingers may move and hinge independently of one another along multiple hinges. These structural features may create greater holding strength and clamping pressure. The increased clamping pressure may provide better penetration through non-conductive oxide and anodizing layers for better electrical conductivity. The independent movement of the interlacable multi-hinge fingers may allow electrical bonding to uneven surfaces. The multiple hinges may be less susceptible to fatigue and failure after multiple uses than a single hinge. When clamped, the fingers alternate rather than interlace. This may provide equal pressure across the clamping surface.

The electrical jumper can electrically bond the chassis or frames of two adjacent devices. The installer may secure the electrical jumper to any electrically conductive surface capable of receiving the clamps of the electrical jumper. For example, an installer could clamp the electrical jumper to an inner or outer flanged lip of a frame or chassis.

The electrical jumper uses clamps rather than threaded fasteners for electrical bonding. This frees the installer from using manufacturer-provided holes for electrical bonding.

In a system using many devices, an installer can use the electrical jumpers between devices to form a daisy claim. The electrical jumper may include apertures for attaching a ground lug. The installer may ground the system by securing a ground lug assembly to one of the electrical jumpers, and tying a wire from the ground lug assembly to the earth ground.

The electrical jumper is scalable. A designer may add more fingers for increased holding strength and current handling capacity.

While the structure of the interlacable multi-hinge fingers is sophisticated, the electrical jumper may be economical to build. A fabricator can stamp and form the electrical jumper from one piece of sheet metal.

This summary discusses a selection of examples and concepts. These do not limit the inventive concept to the examples given. Additional features and advantages will be apparent from the Detailed Description, figures, and claims.

BRIEF DESCRIPTION OF DRAWINGS

FIG. 1 illustrates a front isometric view of an electrical jumper.

FIG. 2 illustrates a rear isometric view of the electrical jumper of FIG. 1.

FIG. 3 illustrates a bottom isometric view of the electrical jumper of FIG. 1.

FIG. 4 illustrates a front view of the electrical jumper of FIG. 1.

FIG. 5 illustrates a top view of the electrical jumper of FIG. 1.

FIG. 6 illustrates a bottom view of the electrical jumper of FIG. 1.

DETAILED DESCRIPTION

Figure 7:
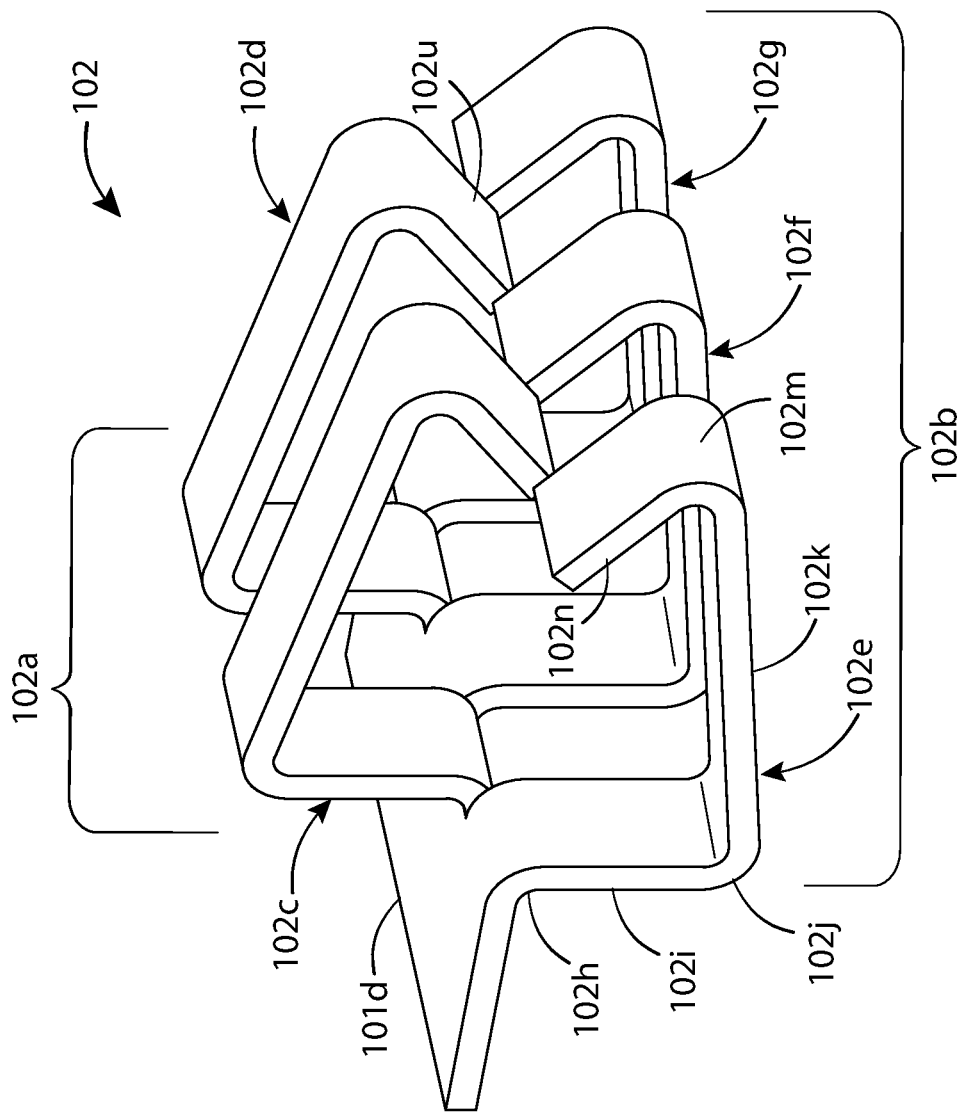
FIG. 7 illustrates a clamp of the electrical jumper of FIG. 1.

This Detailed Description includes the following sections: Definitions, General Description and Examples, and Conclusion and Variations.

Definitions

This Detailed Description and the claims may use ordinal numbers, such as "first," "second," or "third," to tell the difference between similarly named parts. These do not suggest order, preference, or importance. Throughout this disclosure, the words "comprise," "comprising," "include," "including," "have," "having," "contain," or "containing" are inclusive, or open-ended, and do not excluded unrecited elements. This disclosure uses "optional" to describe features or structures that are optional. Omitting "optional" does not imply features or structures are not optional. In this disclosure, "or" is an "inclusive or," unless preceded by a qualifier, such as either, which signals an "exclusive or." Throughout the disclosure, "bonding" means electrical bonding. Throughout this disclosure, "equipotential electrical connection," "equipotential electrical bonding" and "electrical bonding" mean the same thing.

General Description and Examples

This disclosure describes an electrical jumper for equipotential electrical connection between devices. FIGS. 1-6 illustrate an example of the electrical jumper 100 in various views. In FIGS. 1-6, the electrical jumper 100 includes a body 101 and a pair of clamps, clamp 102 and clamp 103. The body and the clamps can conduct electricity. They may be composed of aluminum, steel, or other electrically conductive material. The body 101 includes arm 101a, arm 101b, recess 101c, end 101d, and end 101e.

The clamp 102 and clamp 103 can extend from anywhere along the body 101. For example, in FIGS. 1-6, the clamps extend from opposite ends of the body 101. Clamp 102 extends from end 101d. Clamp 103 extends from end 101e. The ends may extend lengthwise, perpendicularly, or obliquely from the body 101. A sheet metal fabricator may form the ends by folding the arms to extend end 101d and end 101e perpendicularly or obliquely from the body 101. As an example, referring to FIGS. 1 and 2, a metal fabricator can form end 101d by folding the arm 101a along fold 101f. They may form end 101e by folding the arm 101b along fold 101g. FIGS. 5 and 6 illustrate the end 101d and the end 101e extending perpendicularly from arm 101a and arm 101b, respectively.

Referring to FIGS. 1-6, the recess 101c, which is optional, provides a surface to seat and secure a ground lug assembly. The recess may optionally include an aperture. An installer can seat and secure the ground lug to the body 101 through an aperture extending through the recess 101c. The recess 101c may optionally include different sized apertures to accommodate different sized mounting fasteners. FIGS. 1-3, 5, and 6 illustrate three apertures extending through the recess 101c. Aperture 101h, aperture 101i, and aperture 101j have different diameters. FIGS. 11-14 will discuss the ground lug assembly 104 and its relationship with the electrical jumper.

Figure 8:
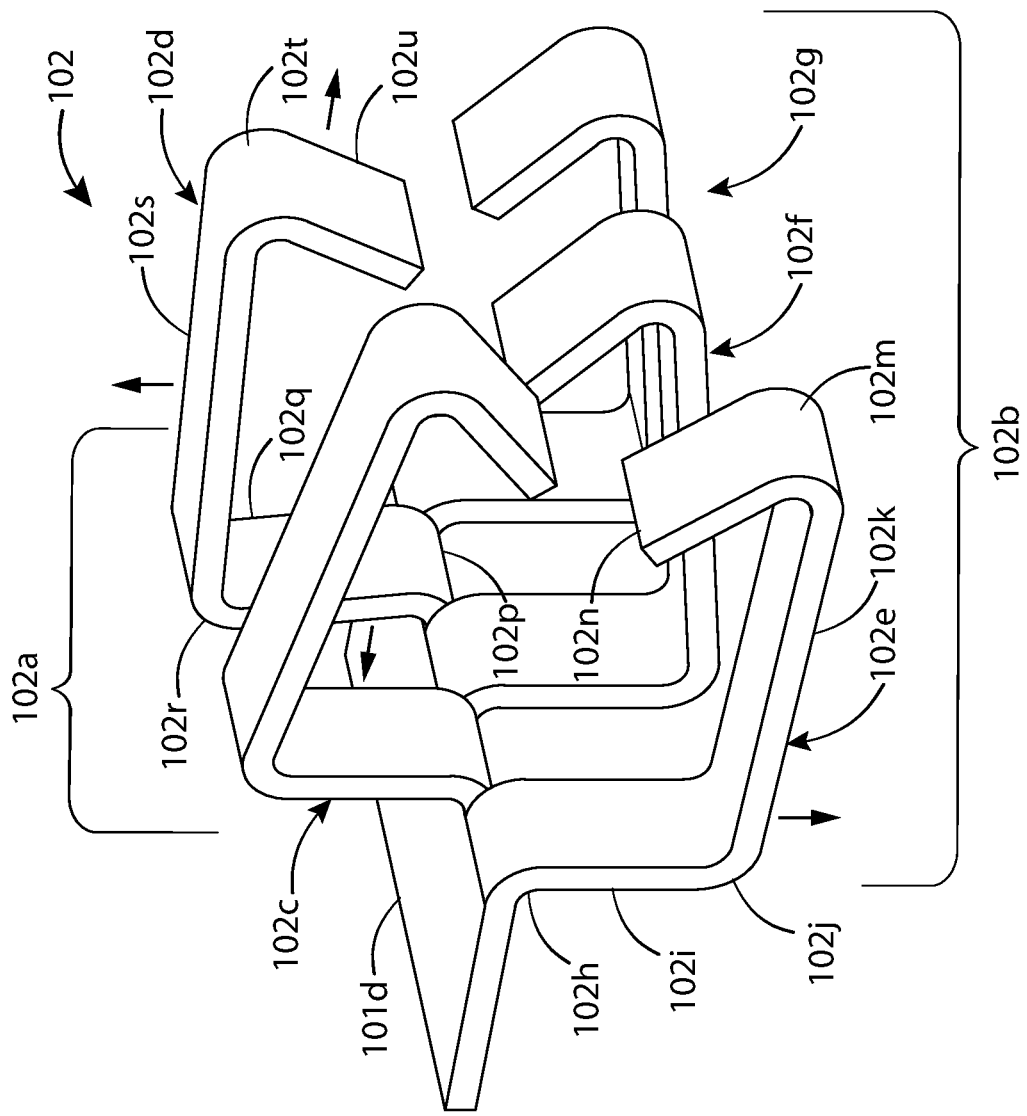
FIG. 8 illustrates the clamp of FIG. 7 with two fingers hinged from their resting position.

Improved holding strength of electrical jumper 100 may derive from interlacable multi-hinge fingers within the clamps. FIGS. 7 and 8 illustrate an example of interlacable multi-hinge fingers (i.e., fingers with two or more hinges). Clamp 102 includes interlacable three-hinged fingers. Downward-facing fingers 102a and upward-facing fingers 102b extend away from the end 101d. The downward-facing fingers 102a interlace with the upward-facing fingers 102b in an unclamped, or resting position. FIG. 7 illustrates the clamp 102 in an unclamped position. In FIG. 7, finger 102c interlaces with finger 102e and finger 102f while these fingers are unclamped. Finger 102d interlaces with finger 102f and finger 102g. Finger ends of upward-facing fingers 102b and downward-facing fingers 102a, face inward toward the end 101d. For example, finger end 102n of finger 102e faces inward toward the end 101d. Finger end 102u of finger 102d also faces inward toward the end 101d. Facing the finger ends toward the body, may provide better holding strength and resistance to movement because of the spring tension between the finger ends and the mounting surface.

The fingers move and hinge independently of one another along the multiple hinges. This may create superior holding strength and clamping pressure. The increased clamping pressure may provide better penetration through non-conductive oxide and anodizing layers for superior electrical conductivity. The independent movement of the interlacable multi-hinge fingers allows electrical bonding to uneven surfaces. In addition, as the interlacable multi-hinge fingers have multiple hinges for hinging, they may be less susceptible to fatigue and failure after many uses. As an example, in FIGS. 7 and 8, finger 102e hinges about hinge 102h, hinge 102j, and hinge 102m. Hinge 102h extends away from the end 101d. The finger base 102i hinges about hinge 102h. The finger midsection 102k hinges about hinge 102j. The finger end 102n hinges about hinge 102m.

FIG. 8, shows an example of how the interlacable multi-hinge fingers can hinge independently of one another. For simplicity, FIG. 8 shows two fingers hinged from their position in FIG. 7. The other three fingers, finger 102c, finger 102f, and finger 102g, remain unmoved. Finger 102e hinges downward about one hinge, hinge 102j. Finger base 102i remains stationary, while finger midsection 102k and finger end 102n move downward. Finger 102d hinges upward about three hinges, hinge 102p, hinge 102r, and hinge 102t. Finger base 102q hinges backward toward end 101d. Finger midsection 102s hinges upward and finger end 102u hinges outward. In a typical application, the downward-facing fingers 102a and the upward-facing fingers 102b might hinge together, but can hinge independently over multiple hinges, when stressed, to improve holding strength.

Figure 9:
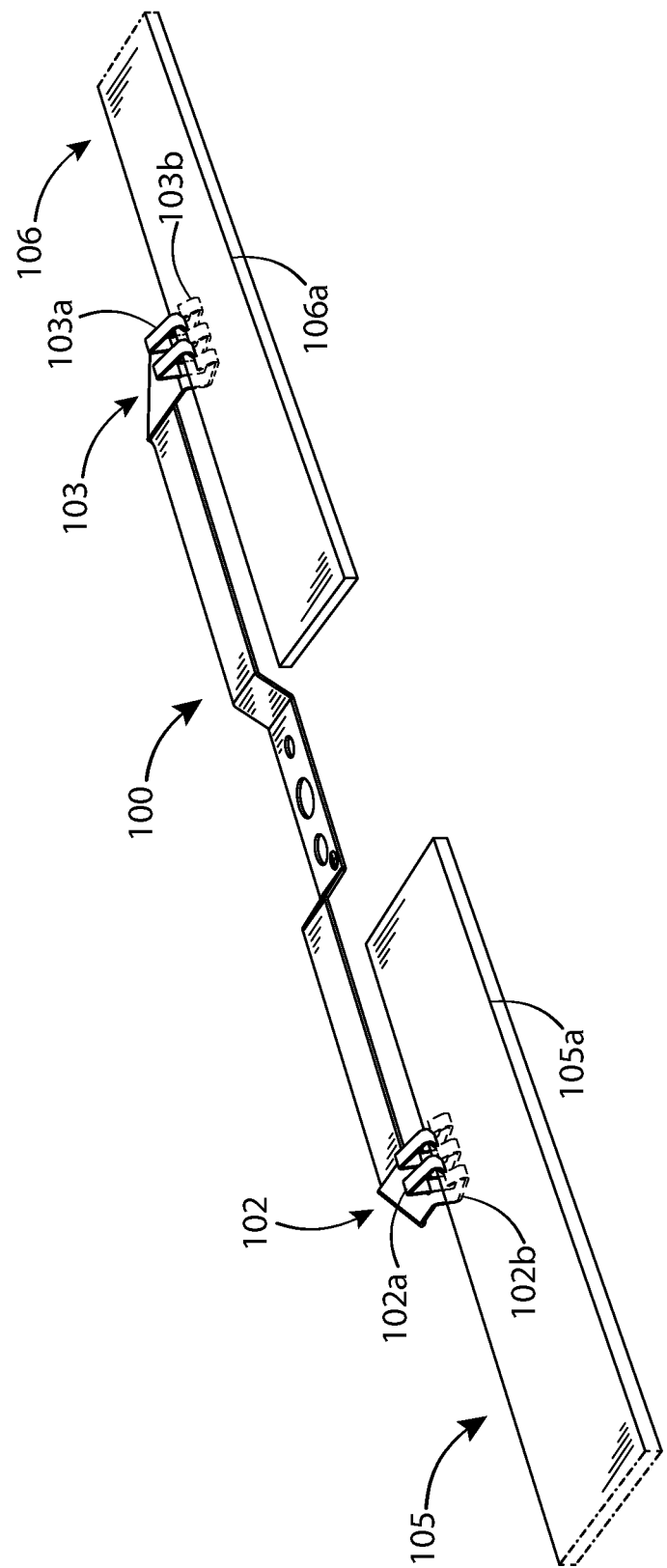
FIG. 9 illustrates, in front perspective view, the electrical jumper of FIG. 1 secured to surfaces of two devices.

FIG. 9 shows the electrical jumper 100 creating an equipotential electrical connection between the chassis or frames of two adjacent devices, device 105 and device 106. The clamp 102 secures the electrical jumper 100 to the device 105. Clamp 103 secures the device 106 to the electrical jumper 100. Device 105 and device 106 hides the upward-facing fingers 102b and the upward-facing fingers 103b, respectively, shown by the dashed lines. When clamped, the downward-facing fingers 102a and the upward-facing fingers 103b alternate. This may create equal pressure across the clamping surface 105a. The downward-facing fingers 103a and upward-facing fingers 103b also alternate when clamped. This similarly may create equal pressure across the clamping surface 106a. The installer can secure the electrical jumper to any electrically conductive surface capable of receiving the clamps. For example, an installer could clamp the electrical jumper to an inner or outer flanged lip of a frame or chassis.

Figure 10:
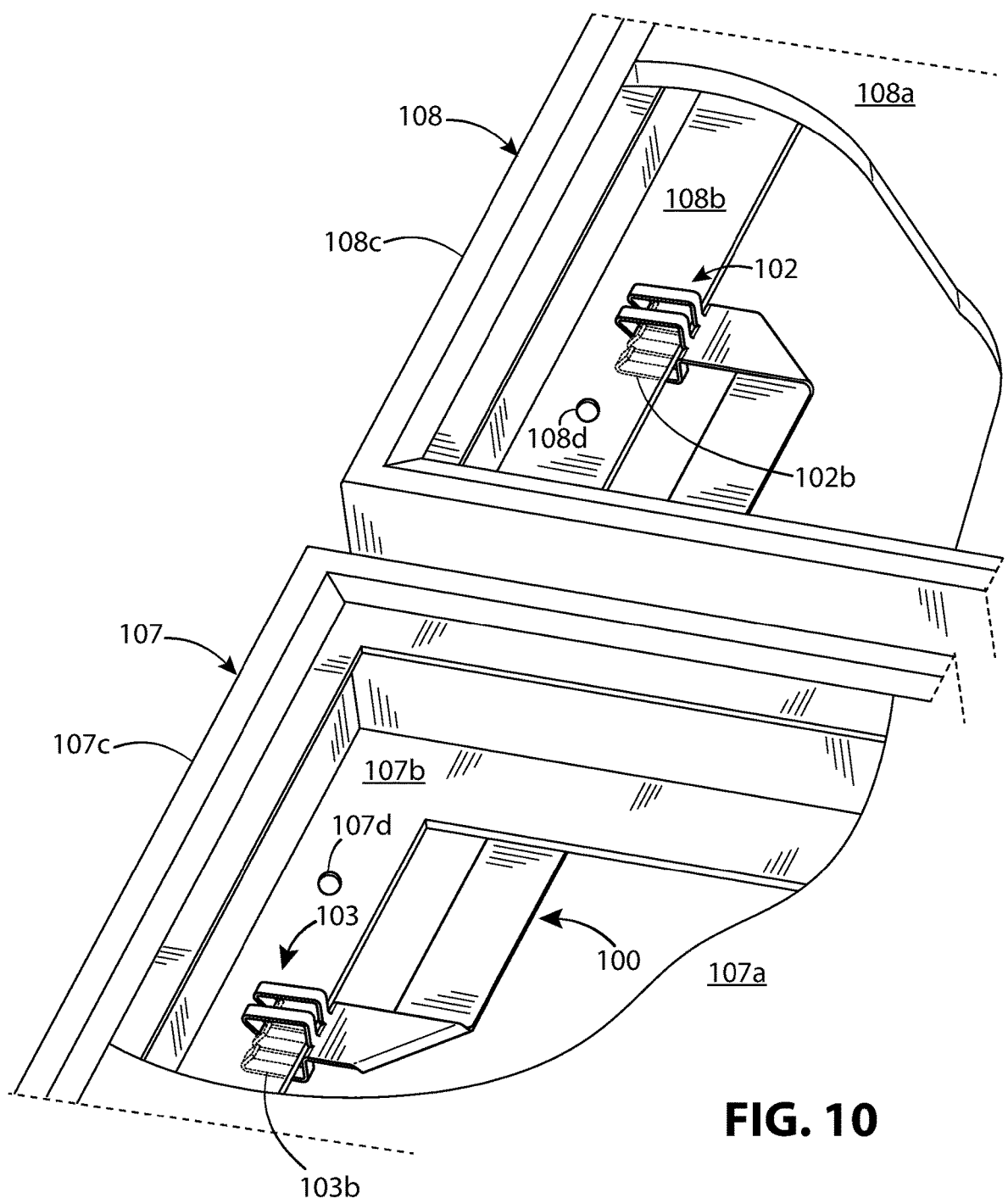
FIG. 10 illustrates, in rear isometric and top cutaway view, the electrical jumper of FIG. 1 secured to the inner lip of the frames of two devices.

FIG. 10 illustrates an example of the electrical jumper creating equipotential electrical connection between the frame of two devices, device 107 and device 108. FIG. 10 illustrates a portion of the device 107 and device 108. The top 107a of device 107 and the top 108a of device 108 are cutaway to show the relationship between the electrical jumper 100 and the frames. The figure illustrates clamp 103 secured to inward-facing flange 107b of the frame 107c and clamp 102 secured to inward-facing flange 108b of frame 108c. Inward-facing flange 107b and inward-facing flange 108b hide upward-facing fingers 103b and upward-facing fingers 102b, respectively, shown by the dashed lines. Device 107 and device 108 can represent any device with an accessible inward-facing lower lip or flange. For example, device 107 and device 108 could represent solar panels. The top 107a and the top 108a could represent the top of the panels with inward-facing flange 107b and inward-facing flange 108b, representing the inward-facing lips or flanges of the panel frames. Manufacturers may provide holes for grounding and electrical bonding in the panel frame. For example, FIG. 10 shows aperture 107d and aperture 108d in inward-facing flange 107b and inward-facing flange 108b, respectively. Typically, an installer uses a threaded fastener to screw a wire jumper with a compression lug to the holes. The hole location may vary by manufacturer, which typically means wire jumper length is installation specific. The electrical jumper of this disclosure uses clamps rather than threaded fasteners for electrical bonding. For this reason, the installer is free not to use manufacturer-provided holes for electrical bonding and can electrically bond where convenient.

Figure 11:
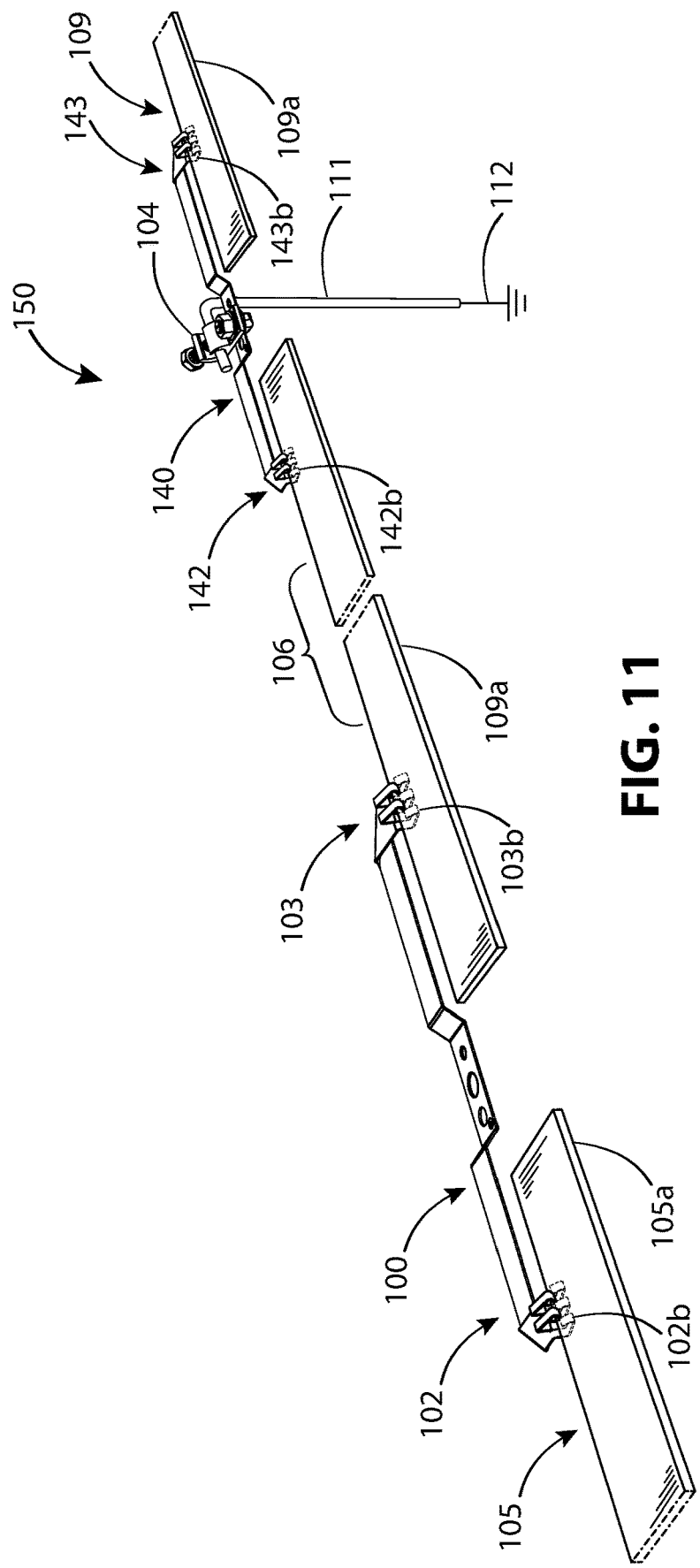
FIG. 11 illustrates, in front perspective view, two instances of the electrical jumpers of FIG. 1 electrically bonding three devices.
Figure 12:
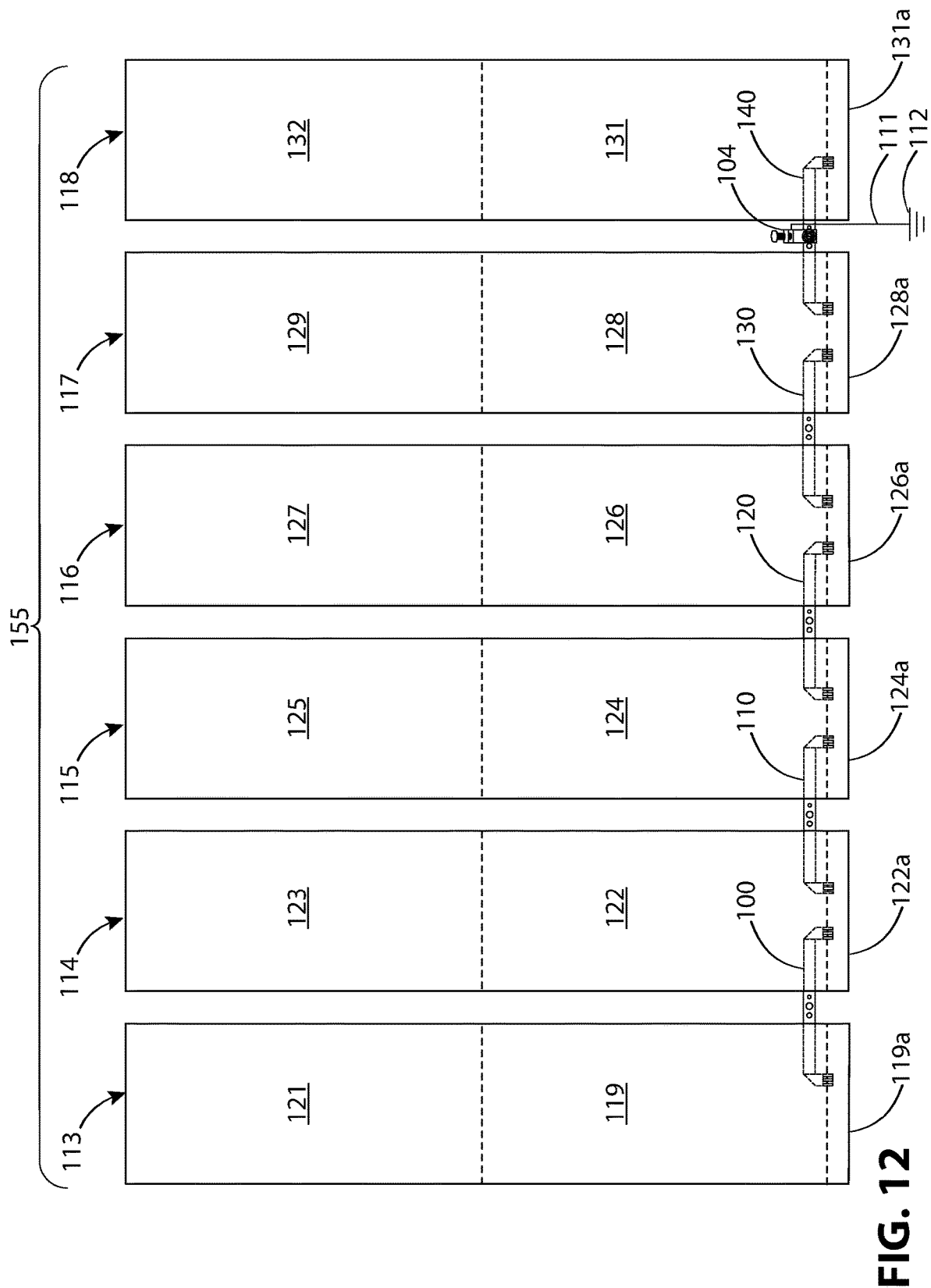
FIG. 12 illustrates, in top plan view, a block diagram of a system using several instances of the electrical jumper of FIG. 1.

In a system of devices, an installer can create an equipotential electrical connection in a daisy chain by securing electrical jumpers between a system of devices. The installer could ground the system by securing one of the electrical jumpers to an earth ground. FIG. 11 illustrates the system 150, which is a simple system. FIG. 12 illustrates a block diagram of system 155, which is a more complex system. FIG. 11 illustrates the electrical jumper 100 secured to device 105 and device 106. FIG. 11 also illustrates the electrical jumper 140 secured to device 106 and device 109. Clamp 102 secures the electrical jumper 100 to device 105. Clamp 103 secures the electrical jumper 100 to device 106. Clamp 142 secures the electrical jumper 140 to the device 106. Clamp 143 secures the electrical jumper 140 to device 109. Clamp 142 and clamp 143 can be instances of clamp 102. FIG. 11 illustrates upward-facing fingers 102b, upward-facing fingers 103b, upward-facing fingers 142b, and upward-facing fingers 143b, hidden from view, as dashed lines. A ground wire 111, secured to the ground lug assembly 104, ties the system to earth or ground 112. Depending on local, regional, or national regulatory requirements, the ground wire may tie to ground 112 by a copper or steel ground rod, or metal pipe, or other electrically conductive device, bonded to the earth.

FIG. 12 illustrates a more complex system, system 155. The system 155, as illustrated, may include devices arranged in columns. The columns can include one or more devices. For example, column 113 includes device 119 and device 121. Column 114 includes device 122 and device 123. Column 115 includes device 124 and device 125. Column 116 includes device 126 and device 127. Column 117 includes device 128 and device 129. Column 118 includes device 131 and device 132. In some installations, a common frame or structure might electrically bond devices within a column. For example, a column could represent rack-mount devices secured to a common frame, or rack. Alternatively, the columns could represent columns of solar panels within a larger system of multiple columns of solar panels. Mounting clamps or other components of the mounting system could electrically bond the panels within the column to equipotential.

Regardless of what the columns represent, electrical jumpers of this disclosure can electrically bond the columns together. In FIG. 12, for example, the electrical jumper 100 bonds the column 113 to the column 114 by electrically bonding the mounting surface 119a to the mounting surface 122a. Electrical jumper 110 bonds the column 114 to the column 115 by electrically bonding the mounting surface 122a to the mounting surface 124a. Electrical jumper 120 electrically bonds the column 115 to the column 116 by electrically bonding the mounting surface 124a to the mounting surface 126a. Electrical jumper 130 electrically bonds the column 116 to the column 117 by bonding the mounting surface 126a to the mounting surface 128a. Electrical jumper 140 electrically bonds the column 117 to the column 118 by electrically bonding the mounting surface 128a to the mounting surface 131a. A ground wire 111, secures to the ground lug assembly 104 and ties the system to earth or ground 112. The mounting surfaces of this example, can be any electrically conductive surface capable of receiving an electrical jumper of this disclosure. For example, the mounting surfaces might be a rear frame portion of an open rack they might be the inside lip of a solar panel frame, as discussed in FIG. 10.

Figure 13:
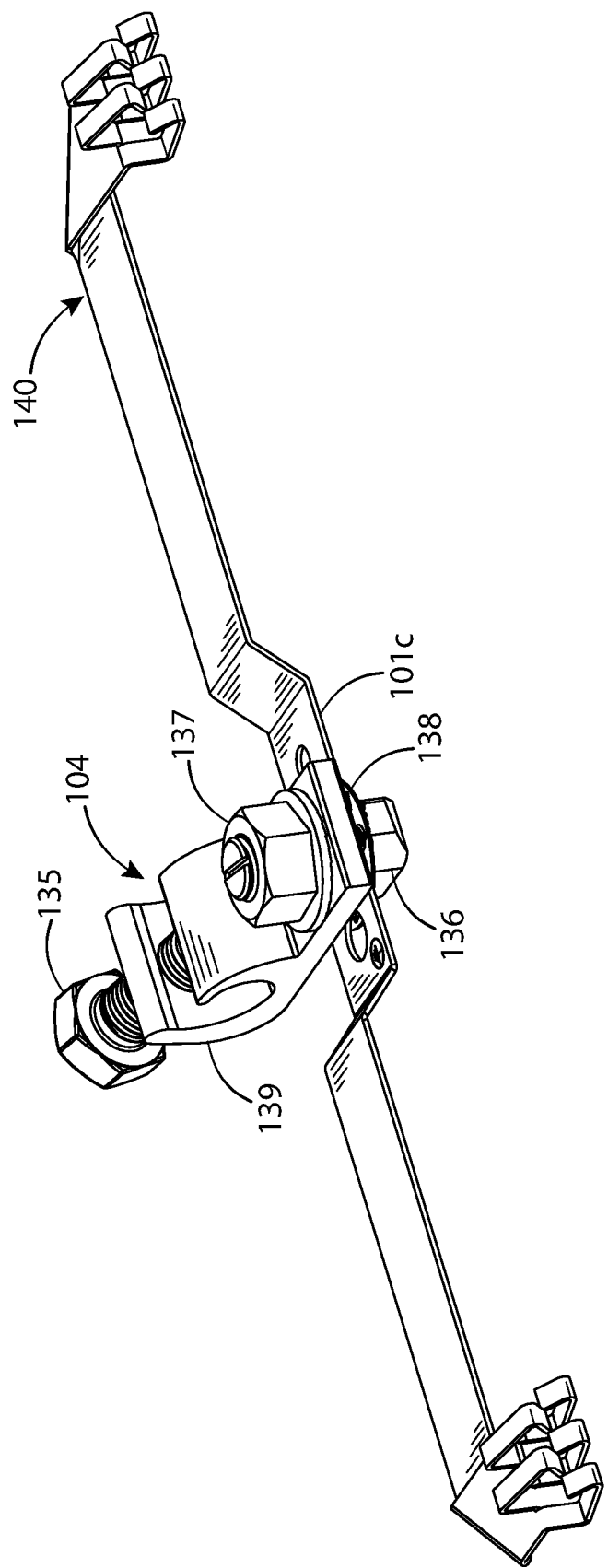
FIG. 13 illustrates, in top isometric view, a ground lug assembly secured to the electrical jumper of FIG. 1.
Figure 14:
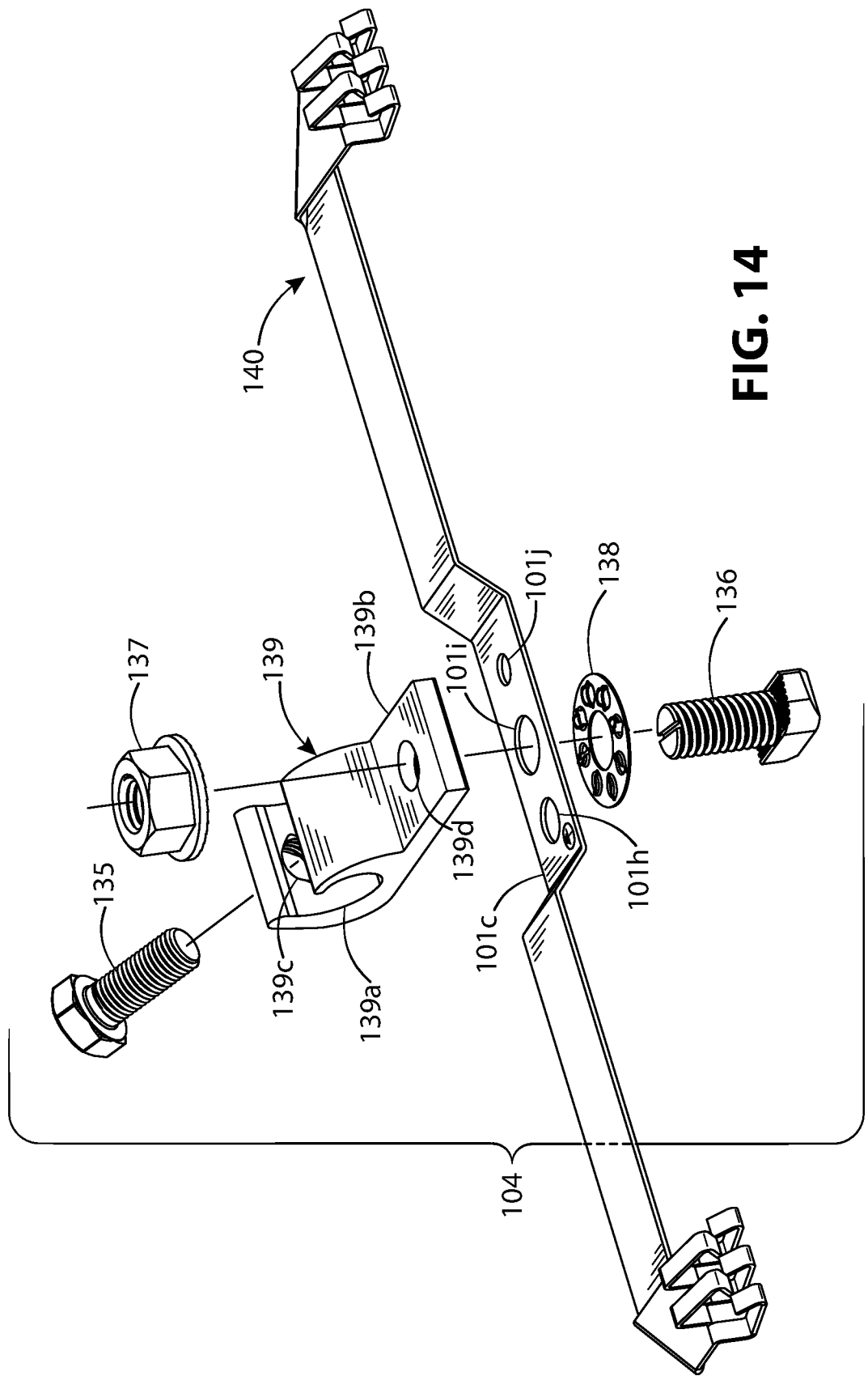
FIG. 14 illustrates, in top isometric and exploded view, the ground lug assembly and electrical jumper of FIG. 1.

FIGS. 13 and 14 show a ground lug assembly 104 attached to the electrical jumper 140. The ground lug assembly may include threaded fastener 135, threaded fastener 136, threaded retainer 137, washer 138, and ground lug 139. The ground lug assembly 104 seats against and secures to recess 101c. In FIG. 13, the washer 138 seats against the bottom of the recess 101c to provide electrical bonding between threaded fastener 136 and the electrical jumper 140. Referring to FIG. 14, the ground lug may include a wire channel 139a and a tab 139b. The tab 139b extends from the wire channel 139a. The tab 139b seats against the recess 101c. Threaded fastener 136 may extend through aperture 101i and aperture 139d and screw into threaded retainer 137. This secures the ground lug 139 to the electrical jumper 140. In this example, threaded fastener 136 passes through aperture 101i. Other, smaller diameter instances of the threaded fastener 136 might instead pass through aperture 101h or aperture 101j. Threaded fastener 135 screws into threaded aperture 139c and extends into the cavity of the wire channel 139a. The threaded fastener 135 can engage a ground wire seated within the wire channel 139a, electrically bonding the ground wire to the ground lug 139.

Figure 15:
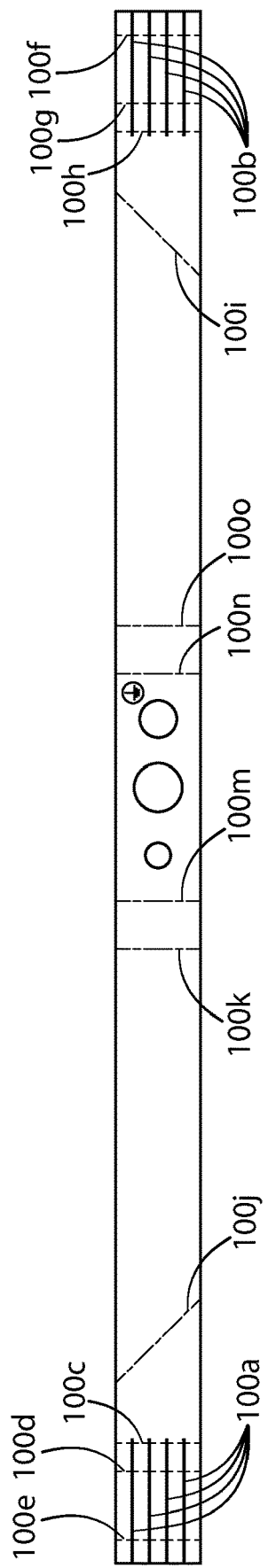
FIG. 15 illustrates an example of a sheet metal assembly drawing for the electrical jumper of FIG. 1.

While the structure of the interlacable multi-hinged fingers is sophisticated, the electrical jumper may be economical to build. FIG. 15 illustrates a non-limiting example of a sheet metal fabrication drawing for the electrical jumper. A fabricator can stamp and form the electrical jumper from one piece of sheet metal. A sheet metal fabricator can form the fingers of the clamps by stamping, punching, or otherwise cutting along cut lines 100a and cut lines 100b and then folding along fold lines 100c, 100d, 100e, 100f, 100g, 100h. A fabricator can form the recess by folding along fold lines 100k, 100m, 100n, 100o.

The sheet metal fabricator creates the end by folding along the fold line 100i and the fold line 100j. As an alternative, they might stamp the electrical jumper as a c-shape, with the ends of the c-shape forming the ends of the electrical jumper. The fabricator can make fingers from the ends as described above.

Conclusion and Variations

The Summary, Detailed Description, and figures describe an electrical jumper for equipotential electrical connection between devices. They also describe examples of systems using multiple instances of the electrical jumper in combination with a ground lug assembly. This disclosure provides examples of devices, components, and configurations to help the reader understand the described general principles. The following are examples of variations and combinations of different components, structures, and features that still adhere to the general principles.

The electrical jumper can have different proportions than those illustrated. The length can be longer or shorter. The width can be narrower or wider. The thickness can be thinner or thicker. The clamps can be larger or smaller. The fingers can be wider or narrower, longer, or shorter, thicker, or thinner. The fingers can be flat, as illustrated. They can be round or multi-sided.

The clamps are scalable. A designer can add more fingers for increased holding strength and current handling capacity. For example, the clamp 102 discussed in FIGS. 7 and 8 could include more fingers on the downward-facing fingers 102a, upward-facing fingers 102b, or both. FIGS. 7 and 8 show the downward-facing fingers 102a with two fingers and upward-facing fingers 102b with three fingers. The downward-facing fingers 102a could include three fingers and the upward-facing fingers 102b could have two fingers. The number of fingers in the downward-facing fingers 102a and the upward-facing fingers could be equal. For example, the downward-facing fingers 102a and the upward-facing fingers 102b could both include three fingers, four fingers, five fingers, and so on.

The clamp 102 could include additional hinges or fewer hinges. For example, the interlacable multi-hinge fingers could include two, three, four, five, or even more hinges. Some fingers could include more hinges than others. The fingers of the downward-facing fingers 102a could include more hinges than the fingers of the upward-facing fingers 102b. The fingers of the upward-facing fingers 102b could include more hinges than the fingers of the downward-facing fingers 102a. Three or more hinges provide better holding strength and electrical connection. Two or more hinges may be less expensive to fabricate. The choice of how many hinges and their placement might depend on, for example, the nature of the mounting surface, the roughness or texture of the top mounting surface in relation to the bottom surface, the amount of grip, and the current carrying capacity.

Referring to FIGS. 1 and 2, the clamp 102 and the clamp 103, as illustrated, face the same direction. The structure of the clamps lends itself to other variations by changing how the end 101d folds along the fold 101f in relation to the arm 101a and how the end 101e folds along the fold 101g in relation with the arm 101b. Both clamps could face upward, downward, forward, or rearward. One clamp could face upward while the other faces downward, forward, or rearward. One clamp could face downward while the other faces forward, or rearward. One clamp could face forward while the other faces rearward. Eliminating fold 101f and fold 101g would cause fingers of both clamps to face lengthwise along the body 101. Eliminating one fold would cause one clamp to face lengthwise along the body 101. The other clamp could face either up, down, forward, or rearward.

The hinges illustrated in FIGS. 7 and 8 are an example of hinges formed by radiused bends in the structure. As described for FIG. 15, these radiused bends are relatively easy to fabricate and may have superior holding strength. Other variations of the hinges are possible, including living hinges. For example, the hinge may be a stamped pattern or a series of grooves within the hinge that allows it to bend easier than the surrounding sections. Thinning the material at the hinge as compared to the surrounding sections might allow the hinge to bend easily. The reader will note that there may be a tradeoff between bendability and holding or clamping strength.

A fabricator may construct the electrical jumper from sheet metal as discussed in FIG. 15. A fabricator could instead cast, machine, or 3D print a metal electrical jumper. A fabricator could mold or 3D print a conductive plastic electrical jumper.

The electrical jumper 100 includes two clamps. Electrical jumpers of this disclosure could include two or more clamps. A sheet metal fabricator could fabricate an electrical jumper with three or more clamps by stamping T-junctions for additional clamps. The fabricator could cut and fold the portions extending from the body into fingers as described for FIG. 15.

The electrical jumper 100 of FIGS. 1-6 includes a recess 101c, which is optional. The height, width, length, and depth of the recess may vary according to the application. For example, a deeper recess, wider recess, or longer recess could seat a larger ground lug assembly. A longer recess could accommodate additional apertures for securing the ground lug assembly. The sides of the recess could project vertically downward or at other angles than illustrated, to accommodate different ground lugs. The sides of the recess could project at other angles than the illustrated angle, to stiffen the body 101 of the electrical jumper 100. Some applications may not use a recess. For example, the body could be planar from end to end. The body could have an upward platform instead of the recess. The body could include more or fewer apertures than illustrated. The body could be without apertures.

The ground lug assembly in FIGS. 13 and 14 is typical. An installer could use any ground lug assembly, or washers and threaded fasteners within the ground lug assembly that meets local, regional, or national safety regulations and is appropriate for the installation environment.

FIG. 12 illustrates the system 155 with electrical jumpers between columns. As illustrated, system 155 includes six columns and two devices per column. System 155 can include fewer columns or more columns. System 155 may also include more or fewer devices per column. More columns and devices may increase the current handling requirements of the electrical jumpers. As described, adding fingers to the electrical jumper can increase current handling capacity.

The variations described, the general principles taught, and undescribed variations, devices, and systems that encompass the general principles described in this disclosure are within the claim's scope.

The invention claimed is:

1. An electrical jumper for equipotential electrical connection, comprising:
   a body;
   a first clamp and a second clamp extending from the body;
   the first clamp and the second clamp each include a first finger, a second finger, a third finger, and a fourth finger;
   the first finger and the second finger each include a first connection portion hingedly connected to and extending upward from the body, a first middle portion hingedly connected to the first connection portion and extending outward away from the body, and a first contact portion hingedly connected to the first middle portion and extending downward and inward toward the body;
   the third finger and the fourth finger each include a second connection portion hingedly connected to and extending downward from the body, a second middle portion hingedly connected to the second connection portion and extending outward away from the body, and a second contact portion hingedly connected to the second middle portion and extending upward and inward toward the body; and
   in an unclamped position, the first finger and the second finger interlace the third finger and the fourth finger and the first contact portion of the first finger and the second finger at least partially cross the second contact portion of the third finger and the fourth finger.

2. The electrical jumper of claim 1, wherein:
the first finger, the second finger, the third finger, and the fourth finger can independently hinge.

3. The electrical jumper of claim 1, wherein:
the first clamp and the second clamp extend obliquely or perpendicularly from opposite ends of the body.

4. The electrical jumper of claim 1, wherein:
in a clamped position, the first contact portion of the first finger and the second finger do not cross the second contact portion of the third finger and the fourth finger.

5. The electrical jumper of claim 1, wherein:
the first middle portion is divided into a first two or more sub-portions hingedly joined together; and
the second middle portion is divided into a second two or more sub-portions hingedly joined together.

6. The electrical jumper of claim 1, wherein:
the first clamp, the second clamp, and the body in combination are from one piece of sheet metal.

7. The electrical jumper of claim 6 wherein:
the first clamp and the second clamp extend from opposite end of the body from folds in the body.

8. The electrical jumper of claim 1, wherein:
the body includes a recess that provides a surface to seat and secure a ground lug assembly.

9. The electrical jumper of claim 8, further including:
the ground lug assembly; and
the ground lug assembly seats and secures to the surface.

\* \* \* \* \*